US012692017B2

(12) United States Patent
Srivastava et al.

(10) Patent No.: US 12,692,017 B2
(45) Date of Patent: Jul. 28, 2026

(54) SCALABLE HIGH-AVAILABILITY LANDING PAD FOR ACCURATE POSITION AND ORIENTATION

(71) Applicant: Honeywell International Inc., Charlotte, NC (US)

(72) Inventors: Romi Srivastava, Lucknow (IN); Ashwin Ganapathy, Bangalore (IN); Mohammed Shafeeq Embram Thody, Crystal, MN (US); Andrew Stewart, Chanhassen, MN (US); Srinath Dama, Bengaluru (IN); Vijay Venkataraman, Excelsior, MN (US)

(73) Assignee: Honeywell International Inc., Charlotte, NC (US)

( * ) Notice: Subject to any disclaimer, the term of this patent is extended or adjusted under 35 U.S.C. 154(b) by 18 days.

(21) Appl. No.: 19/013,280

(22) Filed: Jan. 8, 2025

(65) Prior Publication Data

US 2026/0077880 A1 Mar. 19, 2026

(30) Foreign Application Priority Data

Sep. 19, 2024 (IN) .............................. 202411070841

(51) Int. Cl.
*B64F 1/00* (2024.01)
*B64F 1/18* (2006.01)
(Continued)

(52) U.S. Cl.
CPC ............... *B64F 1/007* (2013.01); *B64F 1/18* (2013.01); *B64U 70/95* (2023.01); *B64U 70/97* (2023.01);
(Continued)

(58) Field of Classification Search
CPC . B64F 1/007; B64F 1/18; B64U 70/95; B64U 70/97; B64U 2101/61; B64U 2101/66
See application file for complete search history.

(56) References Cited

U.S. PATENT DOCUMENTS

| | | |
|---|---|---|
| 9,889,932 B2 | 2/2018 | Sharma et al. |
| 10,124,908 B2 | 11/2018 | Stabler et al. |
| (Continued) | | |

FOREIGN PATENT DOCUMENTS

| | | |
|---|---|---|
| AU | 2021274616 A1 | 11/2021 |
| CN | 106774386 A | 5/2017 |
| (Continued) | | |

OTHER PUBLICATIONS

European Patent Office, "Extended European Search Report", dated Feb. 12, 2026, from EP Application No. 25197962.1, from Foreign Counterpart to U.S. Appl. No. 19/013,280, pp. 1 through 10, Published: EP.

(Continued)

*Primary Examiner* — Omeed Alizada
(74) *Attorney, Agent, or Firm* — Fogg & Powers LLC

(57) ABSTRACT

A method comprises providing a vehicle landing pad with a reference frame origin at a center thereof, and X and Y axes through the reference frame origin; arranging a first group of markers, each having a first size, on the pad such that the first group of markers form a first convex hull about the center of the pad; and arranging a second group of markers, each having a second size less than the first size, on the pad such that the second group of markers form a second convex hull within the first convex hull. The first and second groups of markers are located symmetrically with respect to the center of the pad along the X and Y axes so as to yield a position estimation solution for landing a vehicle having a highest (Continued)

accuracy when compared with placing markers at other locations along the X and Y axes.

19 Claims, 8 Drawing Sheets

(51) Int. Cl.

| | |
|---|---|
| *B64U 70/95* | (2023.01) |
| *B64U 70/97* | (2023.01) |
| *B64U 101/61* | (2023.01) |
| *B64U 101/66* | (2023.01) |

(52) U.S. Cl.
CPC ...... *B64U 2101/61* (2023.01); *B64U 2101/66* (2023.01)

(56) References Cited

U.S. PATENT DOCUMENTS

| | | | |
|---|---|---|---|
| 11,287,835 | B2 | 3/2022 | Jourdan et al. |
| 11,485,516 | B2 | 11/2022 | et al. |
| 11,685,558 | B2 | 6/2023 | Pham et al. |
| 11,745,899 | B2 | 9/2023 | Jourdan et al. |
| 11,866,198 | B2 | 1/2024 | Brockers et al. |
| 2019/0197908 | A1 | 6/2019 | Mozer et al. |
| 2020/0130864 | A1* | 4/2020 | Brockers ................ B60L 53/12 |
| 2020/0201360 | A1* | 6/2020 | Blonder ................ B64U 70/95 |
| 2021/0031945 | A1 | 2/2021 | Inoshita et al. |
| 2021/0362875 | A1 | 11/2021 | Yi et al. |
| 2023/0054875 | A1 | 2/2023 | Jourdan et al. |
| 2024/0017859 | A1 | 1/2024 | Kojima et al. |

FOREIGN PATENT DOCUMENTS

| | | |
|---|---|---|
| CN | 115248600 A | 10/2022 |
| CN | 115527132 A | 12/2022 |
| CN | 116430879 A | 7/2023 |
| WO | 2022147308 A1 | 7/2022 |
| WO | 2023067340 A1 | 4/2023 |
| WO | 2024097457 A2 | 5/2024 |

OTHER PUBLICATIONS

Liu et al., "An Onboard Vision-Based System for Autonomous Landing of a Low-Cost Quadrotor on a Novel Landing Pad", Sensors, Oct. 29, 2019, vol. 19, No. 21, 4703, pp. Title Page through 19.

The Drone Dojo, "Precision Landing a Drone on an Aruco Array", YouTube, Sep. 7, 2020 (Transcript).

Bageshwar, et al., "Systems and Methods for Extracting Surface Markers for Aircraft Navigation", U.S. Appl. No. 18/505,999, filed Nov. 9, 2023, pp. 1 through 45, Published: US.

* cited by examiner

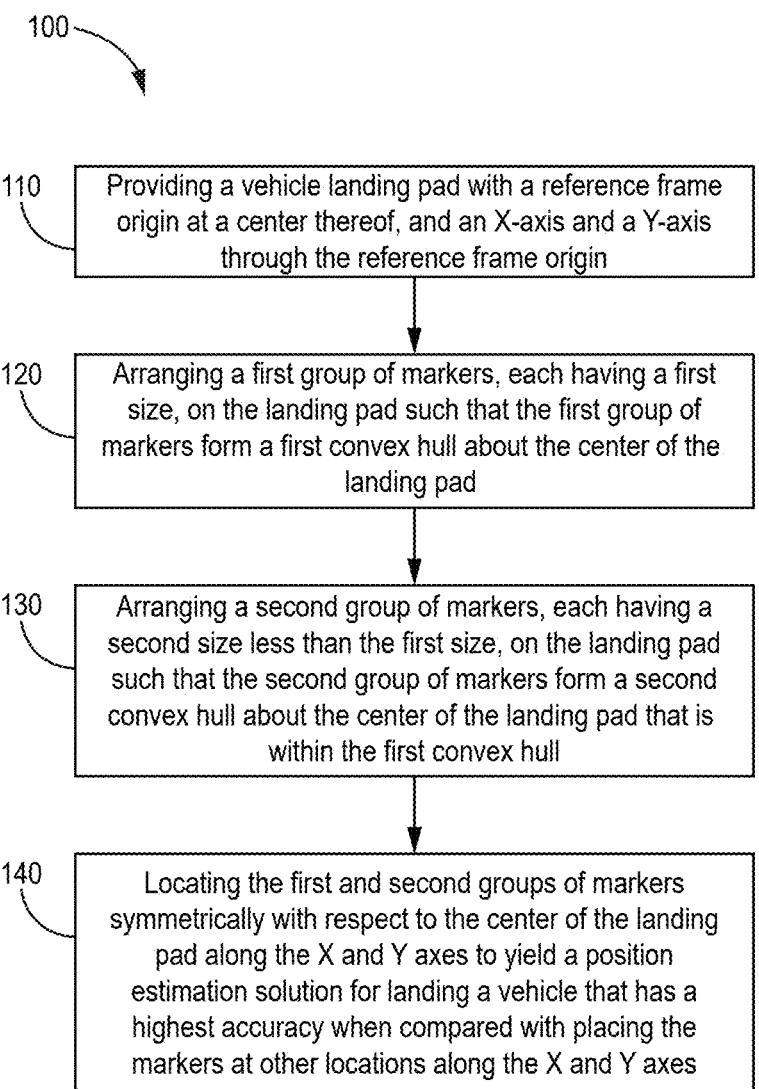

100

110 — Providing a vehicle landing pad with a reference frame origin at a center thereof, and an X-axis and a Y-axis through the reference frame origin 120 — Arranging a first group of markers, each having a first size, on the landing pad such that the first group of markers form a first convex hull about the center of the landing pad 130 — Arranging a second group of markers, each having a second size less than the first size, on the landing pad such that the second group of markers form a second convex hull about the center of the landing pad that is within the first convex hull 140 — Locating the first and second groups of markers symmetrically with respect to the center of the landing pad along the X and Y axes to yield a position estimation solution for landing a vehicle that has a highest accuracy when compared with placing the markers at other locations along the X and Y axes

FIG. 1

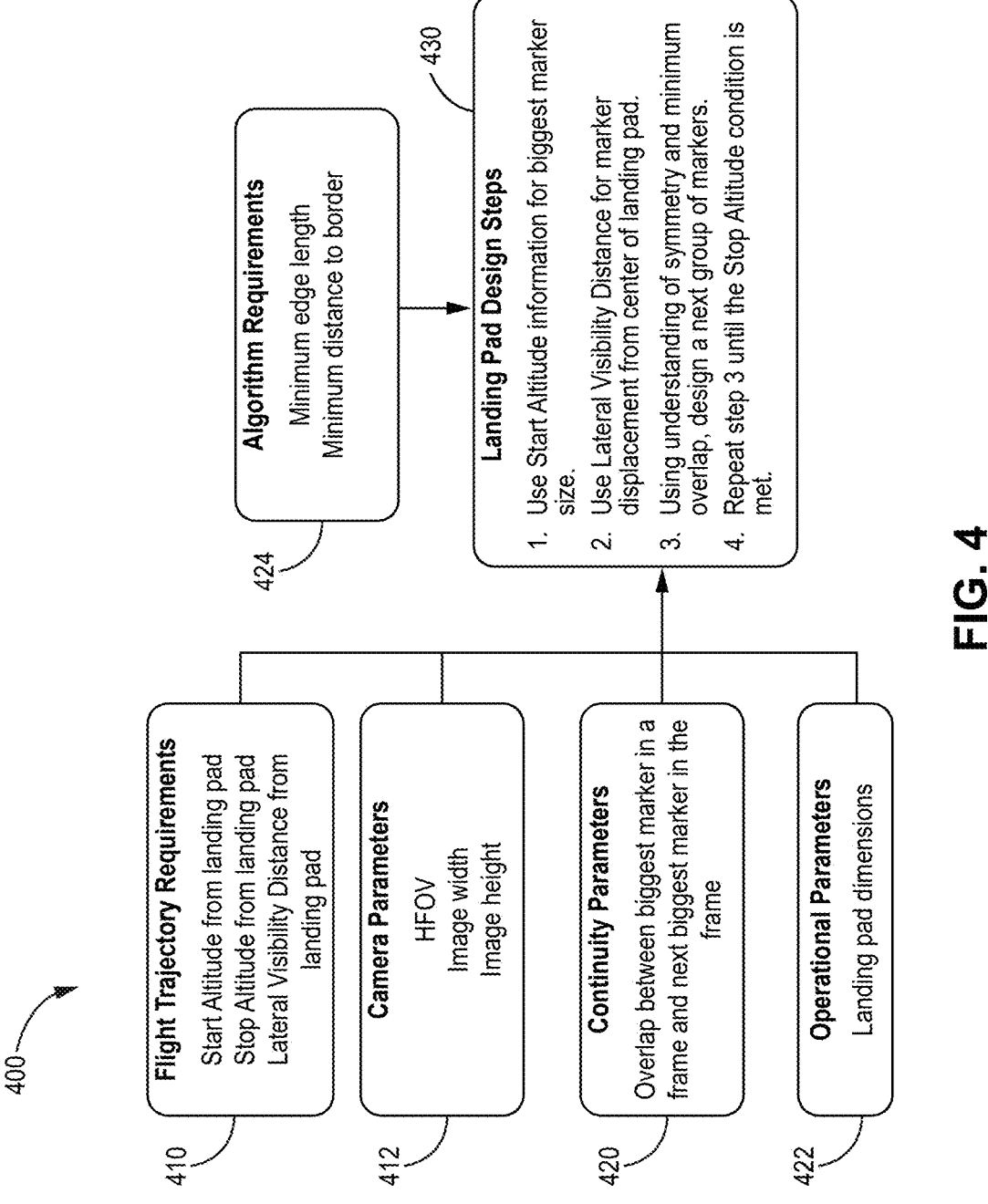

Flight Trajectory Requirements

Start Altitude from landing pad
Stop Altitude from landing pad
Lateral Visibility Distance from landing pad

410

Camera Parameters

HFOV
Image width
Image height

412

Continuity Parameters

Overlap between biggest marker in a frame and next biggest marker in the frame

420

Operational Parameters

Landing pad dimensions

422

Algorithm Requirements

Minimum edge length
Minimum distance to border

424

Landing Pad Design Steps

1. Use Start Altitude information for biggest marker size.
2. Use Lateral Visibility Distance for marker displacement from center of landing pad.
3. Using understanding of symmetry and minimum overlap, design a next group of markers.
4. Repeat step 3 until the Stop Altitude condition is met.

Autonomous Landing With Marker Based Landing Pad

Number of marker group detected

Altitude

25m ①

Detection at 13.31m ②
Last frame at 11.35m ⑴

Detection at 3.93m ③
Last frame at 2.36m ⑵

Detection at 2.12m ④
Last frame at 0.74m ⑶
Visible until 0.5m ④

Landing Pad    1020

Max possible lateral deviations at 15.24 meters (50ft) of altitude
Max possible lateral deviations at 25 meters of altitude 19.13m 13.34m 19.06m 28.50m 14m

1010

SCALABLE HIGH-AVAILABILITY LANDING PAD FOR ACCURATE POSITION AND ORIENTATION

CROSS-REFERENCE TO RELATED APPLICATION

This application claims priority to Indian Provisional Patent Application No. 202411070841 filed on Sep. 19, 2024, the contents of which are incorporated herein by reference in their entirety.

BACKGROUND

For a precise estimation of a vehicle position (vertical and lateral) with respect to a the landing site such as a vertiport, the layout of the vertiport plays an important role. The placement of different landing markers, such as fiducials or Aruco codes, on a landing pad as well as their relative positions and orientations determines the availability and accuracy of estimates for precise localization of the vehicle with respect to the landing pad.

A systematic approach is needed for designing a landing pad to obtain a required accuracy in pose estimation of the vehicle with respect to the landing pad, as well as the availability of markers, with some minimal number of markers always available during the descent/takeoff phase, to achieve the required accuracy.

SUMMARY

A method of designing and producing a marker-based landing pad for a vehicle is provided. The method comprises providing a vehicle landing pad with a reference frame origin at a center thereof, and an X-axis and a Y-axis through the reference frame origin. The method includes arranging a first group of markers, each having a first size, on the landing pad such that the first group of markers form a first convex hull about the center of the landing pad. The method further includes arranging a second group of markers, each having a second size less than the first size, on the landing pad such that the second group of markers form a second convex hull about the center of the landing pad that is within the first convex hull. The first and second groups of markers are located in a symmetrical placement with respect to the center of the landing pad along the X and Y axes so as to yield a position estimation solution for landing a vehicle that has a highest accuracy when compared with placing the markers at other locations along the X and Y axes.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 1 is a flow diagram of a method for designing a landing pad for an aerial vehicle, according to one implementation;

FIG. 4 is a functional block diagram of a method for designing a marker based landing pad for an aerial vehicle, according to one example implementation;

DETAILED DESCRIPTION

Figure 2:
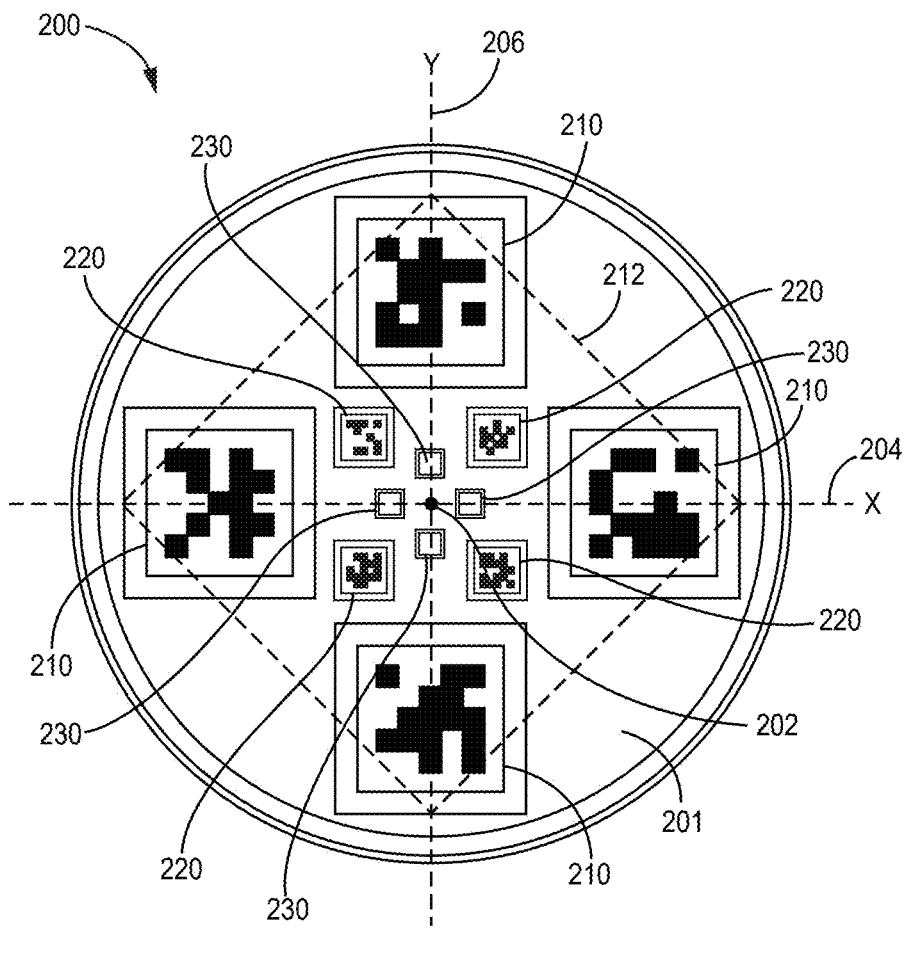
FIG. 2 illustrates a design for a landing pad, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for designing and producing a scalable high-availability marker-based landing pad for accurate position and orientation of a vehicle, are described herein.

The present approach provides a systematic methodology for landing pad design, which can provide for very high accuracy and availability of position estimates for a vehicle. The methodology for landing pad design provides that a maximum number of markers are visible at a given altitude for a given camera in use. As such, the more the number of markers are visible at given time, the more robust the position estimates will be. The landing pad design ensures sufficient overlap between different groups of markers, eliminating the possibility of loss of detection at any given altitude from the beginning until the end of the landing phase. This ensures maximum availability during the landing phase.

The landing pad design provides relative placement of the different sized markers for higher accuracy of vehicle pose with respect to the landing pad. The markers are placed on the landing pad such that the markers form a largest convex hull about the center of the landing pad. The placement of the markers are symmetric along X and Y axis (or local North and East axis), that is, extreme corners of different markers should be at the same or similar distance from the two axes to achieve a similar order of accuracy along both the axes.

The landing pad design allows for the availability of position estimates throughout the descend or ascend process of a vehicle. The relative placement of different sized markers on the landing pad can achieve centimeter-level accuracy in vertical and lateral position when the vehicle is very close to the landing pad to sub-meter accuracy a few meters from the landing pad. This level of accuracy is important for a smooth and safe landing as well as precise control of the vehicle during the descent phase.

The marker-based landing pad can be used by vertical takeoff and landing (VTOL) vehicles, such as an urban air mobility (UAM) vehicle, an uncrewed aircraft systems (UAS) vehicle, a helicopter, a drone, or the like. As used herein, the term "marker" or "markers" can include reference markers, fiducials, structured patterns, Aruco codes, or the like, and any variants thereof. The landing pad design can be easily scaled to different landing site dimensions as well as different camera characteristics.

In one embodiment, a first group of outermost markers on the landing pad includes four individual markers that are distinct from each other and have a first size. A second group of markers on the landing pad is within first group of outermost markers and includes four individual markers that are distinct from each other and from the markers in the first group of markers. In this embodiment, each marker in the first and second groups of markers have a different identification (ID) number.

The relative orientation and placement of the markers on the landing pad increases the accuracy of position estimates when using a marker-based landing solution, such as under Global Navigation Satellite System (GNSS) denied or degraded scenarios at vertiports.

Further details of various embodiments are described hereafter and with reference to the drawings.

FIG. 1 is a flow diagram of a method 100 for designing a landing pad for an aerial vehicle, according to one implementation. The method 100 comprises providing a vehicle landing pad with a reference frame origin at a center thereof, and an X-axis and a Y-axis through the reference frame origin (block 110). The method 100 further includes arranging a first group of markers, each having a first size, on the landing pad such that the first group of markers form a first convex hull about the center of the landing pad (block 120); and arranging a second group of markers, each having a second size less than the first size, on the landing pad such that the second group of markers form a second convex hull about the center of the landing pad that is within the first convex hull (block 130). The first and second groups of markers are symmetrically located with respect to the center of the landing pad along the X and Y axes so as to yield a position estimation solution for landing the vehicle that has a highest accuracy when compared with placing the markers at other locations along the X and Y axes (block 140).

The method 100 can further comprise arranging one or more additional groups of markers, each having a size less than the second size, on the landing pad such that the one or more additional groups of markers form one or more additional convex hulls about the center of the landing pad that are within the second convex hull. The one or more additional groups of markers are placed symmetrically with respect to the center of the landing pad along the X-axis and the Y-axis.

The symmetrical placement of the markers along the X and Y axes ensures that corners of the markers are separated in a frame of a camera on the vehicle, which increases a size of the first or second convex hulls that impact positively on the position estimation solution. For visible corners of the markers in a scene, the position estimation solution is most accurate when the visible corners are farthest from a center of the frame, which improves accuracy of the position estimation solution.

The method 100 can also comprise determining a marker size for the first group of markers using altitude requirements, such that the first group of markers is visible in a frame of a camera on the vehicle, which is at a farthest altitude and lateral offset with respect to the landing pad. The method 100 also includes determining a displacement distance for the first group of markers from the center of the landing pad; and determining a minimum distance of an overlap between the first group of markers and the second group of markers, such that a proper handover will occur between the first group of markers and the second group of markers, without any blind spots, during a landing phase for the vehicle.

The overlap between the first and second groups of markers increases available corners of the markers in the frame, which further increases availability of the position estimation solution of the vehicle. An increase in overlapping of the markers provides for choosing corners that are spread further in the frame, thus increasing an accuracy of the position estimation solution. The overlapping of the markers also ensures that a next biggest group of markers coming into view of the camera satisfy a minimum edge length requirement for improved position estimation accuracy.

FIG. 2 illustrates a design for a landing pad 200, according to one embodiment. The landing pad 200 has a pad surface 201 with a reference frame origin at a center 202, and an X-axis 204 and Y-axis 206, which pass through center 202. A first group of markers 210, such as Aruco code markers, are located on pad surface 201 and are arranged symmetrically with respect to center 202 along X-axis 204 and Y-axis 206. The markers 210 have a first size and are arranged on landing pad 200 to form a first convex hull 212 around center 202.

A second group of markers 220, such as Aruco code markers, are also located on pad surface 201, and are arranged symmetrically with respect to center 202 along X-axis 204 and Y-axis 206. The markers 220 have a second size that is less than the first size of markers 210. The markers 220 are arranged on landing pad 200 to form a second convex hull around center 202 that is within first convex hull 212.

In addition, a third group of markers 230, such as Aruco code markers, are also located on pad surface 201, and are arranged symmetrically with respect to center 202 along X-axis 204 and Y-axis 206. The markers 230 have a third size that is less than the second size of markers 220. The markers 230 are arranged on landing pad 200 to form a third convex hull around center 202 that is within second convex hull 222.

In the design of landing pad 200, each of the markers within a respective group are equally separated along both the X and Y axes. Each group of makers forms a largest convex hull among themselves and are symmetrically placed along each axis. The design of landing pad 200 ensures establishment of maximum separation along each axis for a given dimension, which helps ensure low angular error and increased accuracy in position estimate along both axes. As an aircraft descends, the markers which are closer to the center of the landing pad will become visible, as they are smaller in dimension. The design of landing pad 200 ensures that the visible groups of markers at a given altitude form the maximum possible convex hull along with maintaining the symmetry of markers about the axes.

Figure 3:
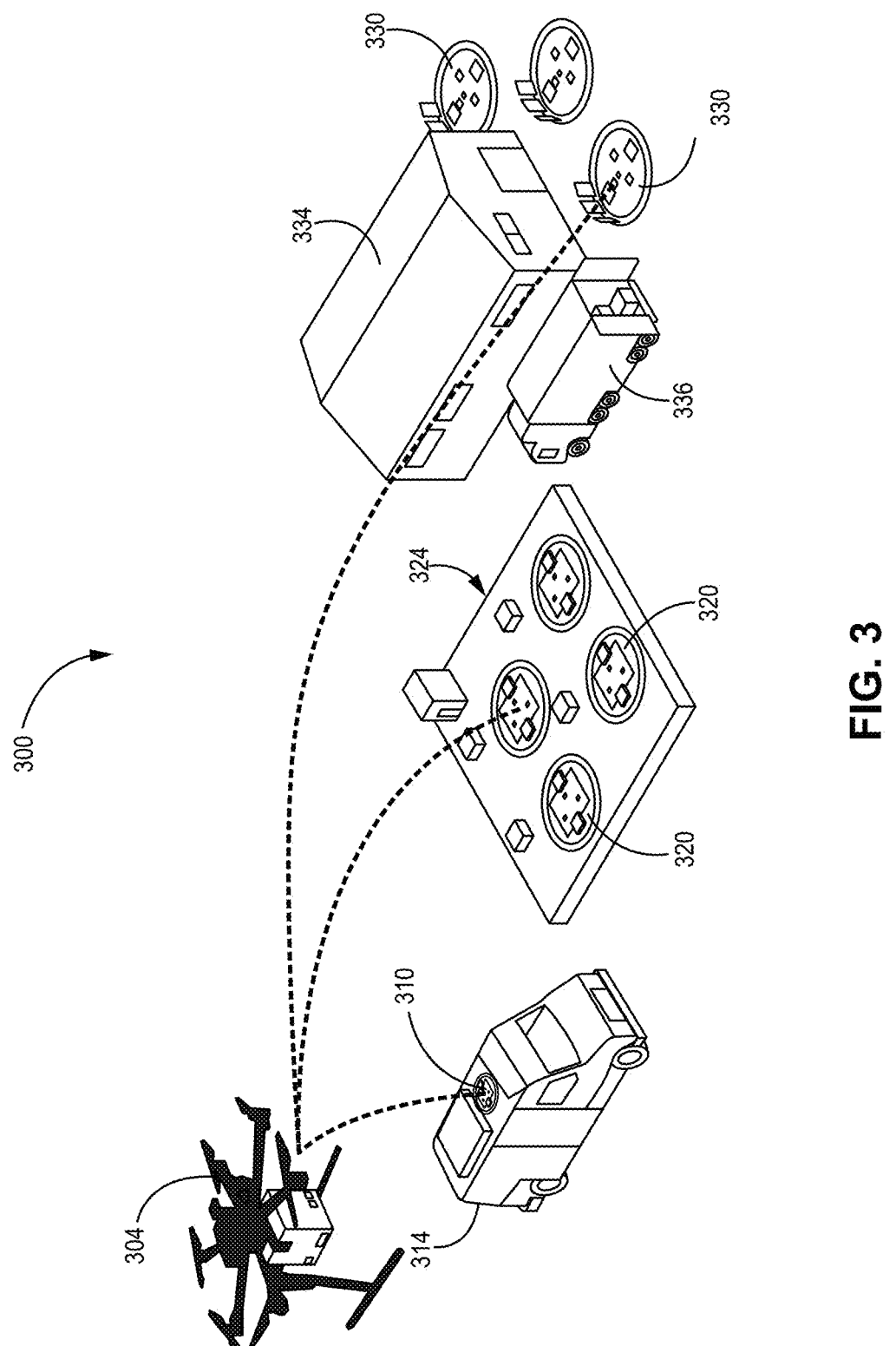
FIG. 3 illustrates various example locations where marker based landing pads for precision landing of aerial vehicles can be employed.

FIG. 3 illustrates various example locations 300 where the present marker based landing pads for precision landing of an aerial vehicle 304, such as a drone for package delivery, can be employed. For instance, a landing pad 310 can be located on the roof of a delivery vehicle 314; a set of landing pads 320 can be located at a vertiport 324; and a set of landing pads 330 can be located near a warehouse 334 where packages are loaded onto a truck 336.

The following sections describe a design methodology for a use case where an aircraft flying at a given height needs to do lateral alignment with a landing pad and once aligned with the center of the landing pad, autonomously lands on the landing pad such as at a vertiport. To achieve this objective, a maximum number of markers need to be visible at a given altitude for a given camera in use (e.g., FOV and resolution of the camera) for robust estimates of pose at any given time. The landing pad design should be such that there is proper handover between different sets of markers, with sufficient overlap between the different sets of the markers, so that there is no blind spot during the landing phase and maximum availability of the markers is ensured.

FIG. 4 is a functional block diagram of a method 400 for designing a marker based landing pad for an aerial vehicle, according to one example implementation. The method 400 utilizes adjustable parameters and fixed parameters. The adjustable parameters include flight trajectory requirements (block 410), such as start altitude information from the pad (e.g., 25 m), stop altitude from the pad (e.g., 1 m), and lateral visibility distance from the pad (e.g., 25 m). The adjustable parameters also include camera parameters (block 412), such as horizonal field of view, HFOV, (e.g., 90 degrees), image width (e.g., 1920 pixels), and image height (e.g., 1200 pixels).

The fixed parameters include continuity parameters (block 420), such as the overlap distance between the biggest marker in a frame and the next biggest marker in the frame (e.g., 1 m); and operational parameters (block 422), such as the pad dimensions (e.g., 15 m diameter). The fixed parameters also include algorithm requirements (block 424), such as minimum edge length (e.g., 50 pixels) and minimum distance to border (e.g., 30 pixels).

The adjustable parameters and fixed parameters are used as inputs for landing pad design steps (block 430). These design steps include: 1) use the start altitude information for a biggest marker size; 2) use lateral visibility distance for marker displacement from the center of the landing pad; 3) using the understanding of symmetry and minimum overlap, design a next group of markers; 4) repeat step 3 until the stop altitude condition is met.

Note that the same pad can be scaled to be deemed usable for different camera and flight trajectory requirements. The operational parameters are fixed as they are determined by the boundary of the landing site (e.g., airports, building tops, etc.). The algorithm requirements are set based on thresholds that estimate accurate poses. The camera and flight trajectory parameters are adjustable due to the operational parameters playing a role in placing the outermost markers.

The landing pad design steps are described in further detail as follows.

Biggest Marker Size

Figure 5:
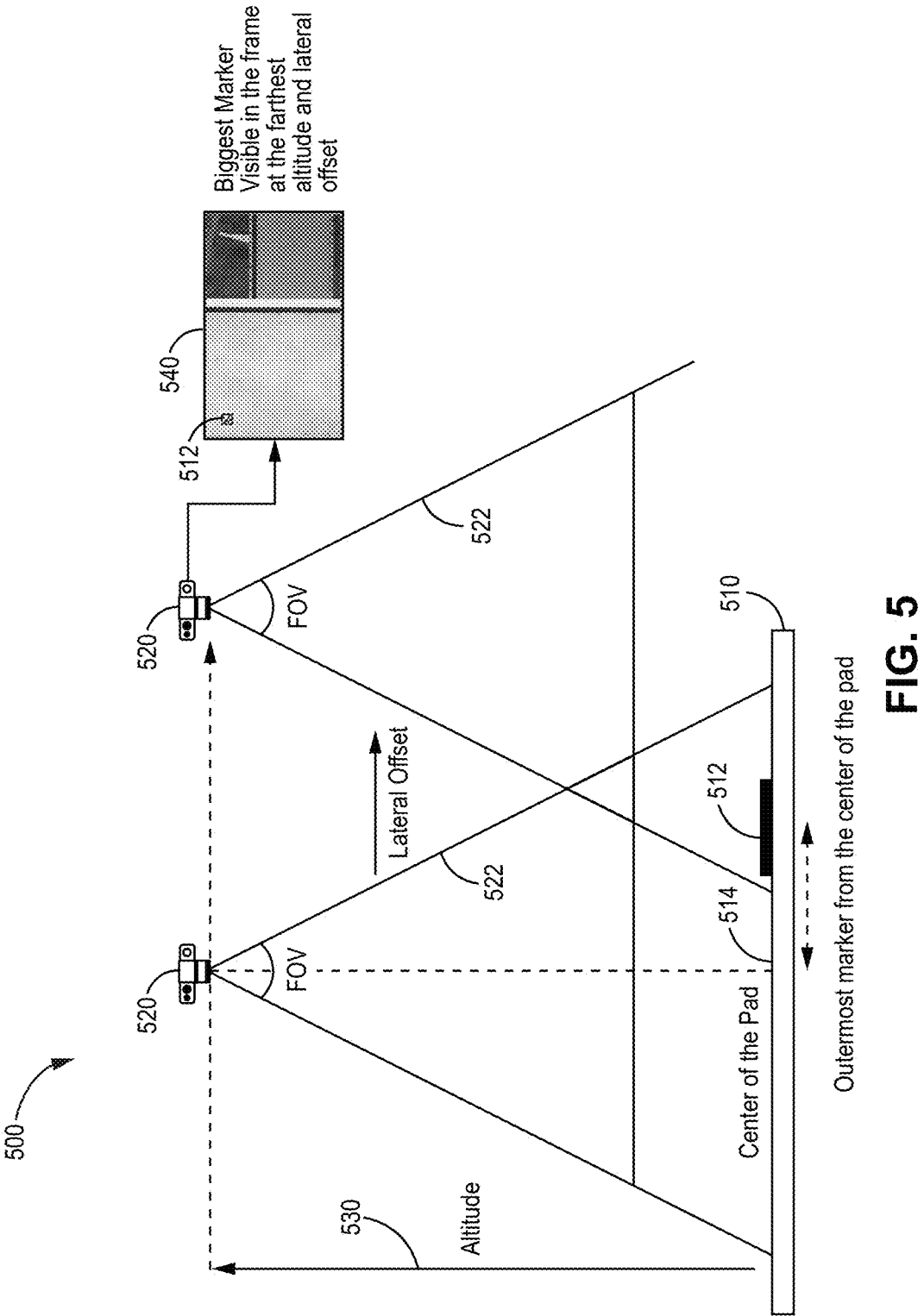
FIG. 5 is a schematic diagram that illustrates a step of determining a biggest marker size for a landing pad, according to one example.

The biggest marker size is determined using the altitude requirements. FIG. 5 is a schematic diagram 500 that illustrates the step of determining a biggest marker size for a landing pad 510, according to one example. An outermost marker 512 on landing pad 510 is located a selected distance from a center 514 of landing pad 510. A camera 520 has a given altitude 530 above landing pad 510. The camera 520 has a given field of view (FOV) 522 of landing pad 510 at a first position 524. The center 514 of the landing pad 510 is within FOV 522 of camera 520 at a first position above landing pad 510. When camera 520 moves to a laterally offset second position above landing pad 510, outermost marker 512 is still located within FOV 522 of camera 520.

As shown, at the second position, marker 512 is still visible in a camera frame 540 at the farthest altitude and lateral offset.

In one example, a marker size=55 (px)×(altitude/focal length (px)). The focal length (px) is derived from FOV and image resolution. The lateral offset and pad dimensions (e.g., 15 m) based on the landing site dimensions is used to determine the displacement of the outermost marker from the center of the pad.

Displacement of Biggest Marker

Since symmetrical marker placements is learned to yield the best results, the outermost biggest markers are placed in the corners of the pad. The lateral visibility distance is used for marker displacement from the center of the pad. In one example, an algorithm parameter of 30 px as the minimum distance to the pad border is used to displace the biggest marker from the center of the pad.

Figures 6, 7A, 7B:
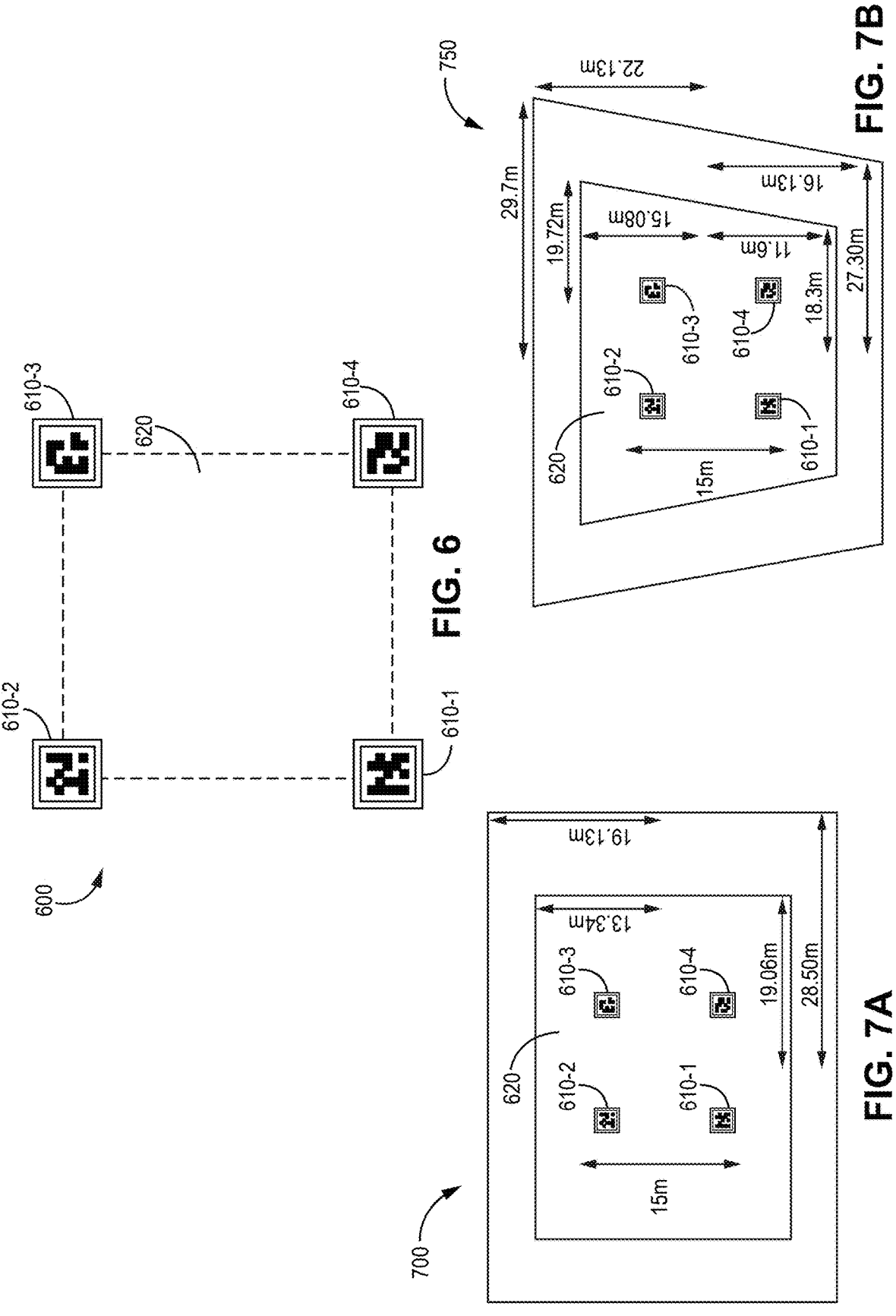
FIG. 6 is a schematic diagram 600 that illustrates the step of determining a displacement of the biggest markers, according to one example.
FIG. 7A is a schematic diagram showing extents with a down looking camera view of the biggest markers of FIG. 6.
FIG. 7B is a schematic diagram showing extents with a down looking camera view at a 5 degree pitch angle of the biggest markers of FIG. 6.

FIG. 6 is a schematic diagram 600 that illustrates the step of determining a displacement of the biggest marker, according to one example. An outermost first group of markers 610-1 to 610-4 are placed in four corners of a landing pad area 620.

FIG. 7A is a schematic diagram 700 showing extents with a down looking camera view of markers 610-1 to 610-4 of landing pad area 620, with various example dimensions.

FIG. 7B is a schematic diagram 750 showing extents with the down looking camera view at a 5 degree pitch angle of markers 610-1 to 610-4 of landing pad area 620, with various example dimensions. The change in visible frustum changes the visible distance along each axis.

Minimum Overlap

Once the outermost group of markers are designed, the subsequent group of markers are designed, keeping a minimum overlap (e.g., 1 m) between the previous group of markers and the next group of markers. For example, the size of a second group of markers is visible within 1 m before the first group of markers disappears from the camera view.

Figure 8:
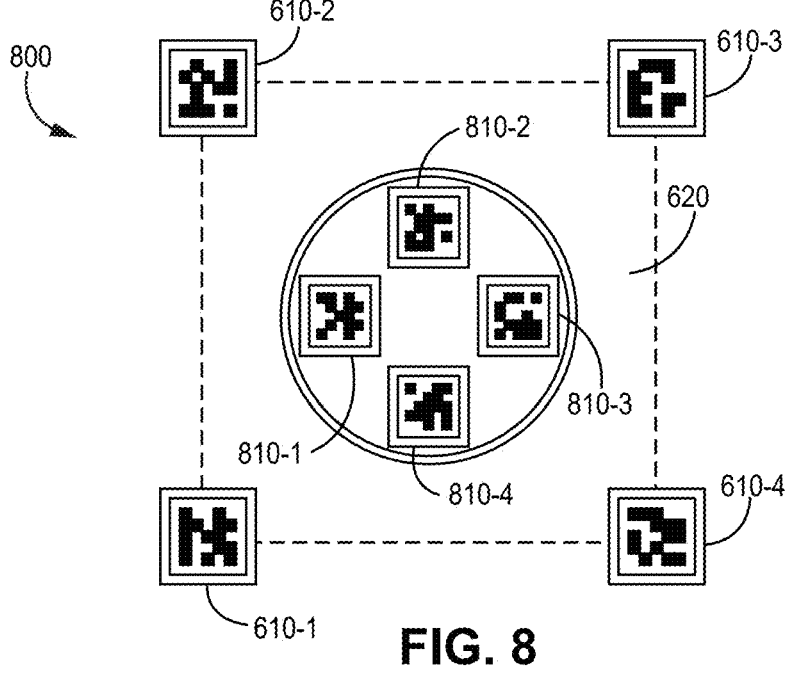
FIG. 8 is a schematic diagram showing a second group of markers within an outermost first group of markers of a landing pad area.

FIG. 8 is a schematic diagram 800, showing a second group of markers 810-1 to 810-4 within the outermost first group of markers 610-1 to 610-4 of landing pad area 620. The group of markers 810-1 to 810-4 are designed such that a minimum overlap is maintained with markers 610-1 to 610-4.

Figure 9:
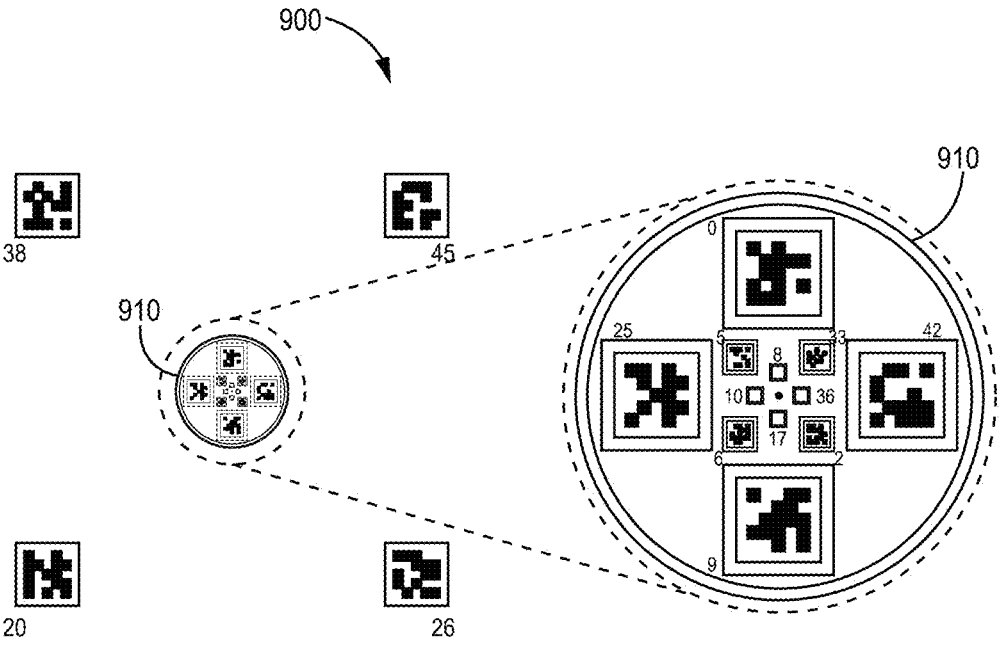
FIG. 9 is a schematic diagram showing various marker groups designed to maintain a minimum overlap of a landing pad area.

FIG. 9 is a schematic diagram 900, showing various marker groups designed to maintain the minimum overlap of a landing pad area. In marker group 1, the group IDs are 20, 38, 45, 26. Remaining marker groups 910 are shown more clearly in the enlarged view. As shown, in marker group 2, the group IDs are 25, 0, 42, 9; in marker group 3, the group IDs are 6, 5, 33, 2; and in marker group 4, the group IDs are 10, 8, 36, 17. Each marker group forms a biggest convex hull among themselves. The markers within the same group are symmetrically placed with respect to a center of the landing pad along each axis. This design ensures the optimal placement of markers for accurate pose estimation, and also ensures that there is sufficient overlap when transiting from one marker group to another marker group during a descent.

In this example the pad diameter can be 14 meters, but this can vary depending on operational needs. In addition, the markers and their IDs described herein are for representation purposes, and can be changed as needed.

Table 1 below summarizes a maximum possible horizontal X offset at 50 ft altitude.

TABLE 1

| Maximum possible horizontal X offset (m) at 50 ft | | | | | |
|---|---|---|---|---|---|
| Pad diameter (m) | 3 | 5 | 7 | 9 | 15 |
| FOV_x (Deg) | | | | | |
| 57.7 | 8.83 | 9.29 | 9.75 | 10.22 | 11.60 |
| 65 | 10.08 | 10.55 | 11.01 | 11.47 | 12.86 |
| 75 | 12.01 | 12.47 | 12.93 | 13.39 | 14.78 |
| 90 | 15.44 | 15.90 | 16.36 | 16.83 | 18.21 |

Table 2 below summarizes a maximum possible horizontal Y offset at 50 ft altitude

TABLE 2

| Maximum possible horizontal Y offset (m) at 50 ft altitude | | | | | |
|---|---|---|---|---|---|
| Pad diameter (m) | 3 | 5 | 7 | 9 | 15 |
| FOV_x (Deg) | | | | | |
| 57.7 | 5.84 | 6.41 | 6.98 | 7.55 | 9.27 |
| 65 | 6.61 | 7.18 | 7.75 | 8.32 | 10.04 |
| 75 | 7.78 | 8.35 | 8.92 | 9.50 | 11.21 |
| 90 | 9.88 | 10.46 | 11.03 | 11.60 | 13.31 |

Tables 1 and 2 show the impact of scaling the landing pad or changing the camera FOV on the lateral visibility, for a given pad design. For example, increasing the FOV/scaling of the pad increases horizontal distance at which the marker is visible. In addition, scaling the pad size and increasing the FOV yields the maximum horizontal visible distance. The horizontal visible distance can be increased until the borders of the marker do not go out of the frame, when the scale is increased.

Example of Design Elements with Marker Detection and Estimation Accuracy

Figures 10A, 10B:
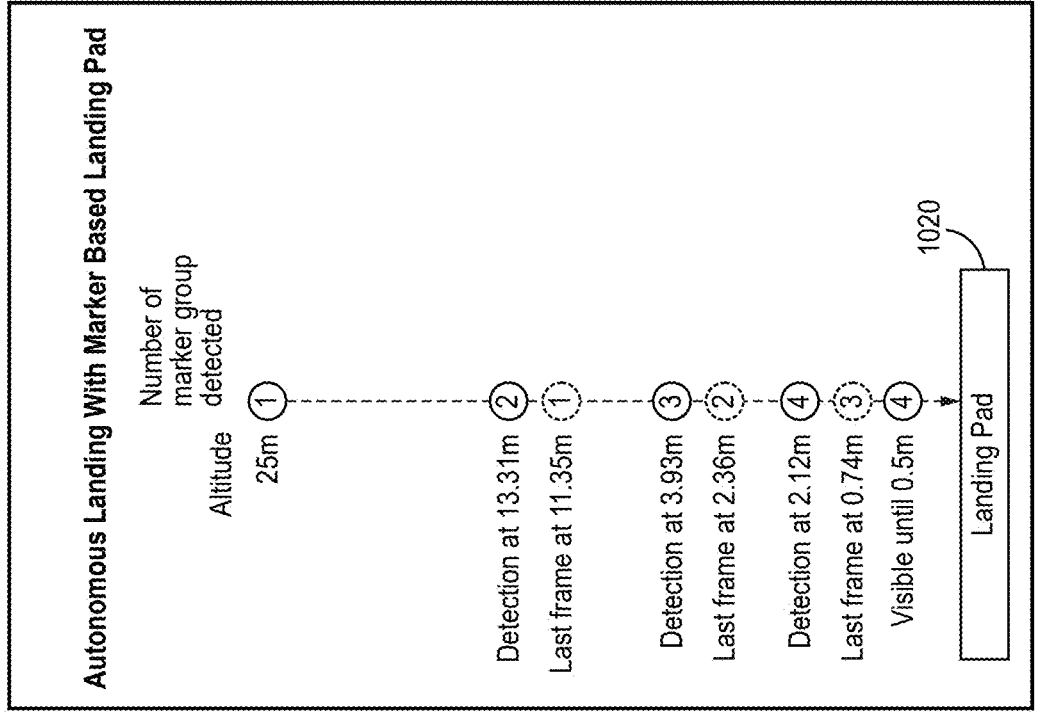
FIGS. 10A and 10B illustrate an example of marker detection and estimation accuracy using the landing pad area design of FIG. 9

FIGS. 10A and 10B illustrate an example of marker detection and estimation accuracy using the landing pad design of FIG. 9 for landing a VTOL aircraft 1010 on a landing pad 1020. The maximum possible lateral deviations at 15.24 meters (50 ft) of altitude is shown along with the maximum possible lateral deviations at 25 meters of altitude in FIG. 10A. The camera assumptions include: suitable for camera field of view −90°; camera resolution (1920×1200); camera at geometric center, level; lateral visibility can be increased by scaling the marker pad, using larger markers, or using larger FOV of the camera; and integrity of detection can be increased by switching to higher bits pattern (e.g., 7×7, 9×9, etc.).

FIG. 10B illustrates an example of autonomous landing of VTOL aircraft 1010 using marker based landing provided by landing pad 1020. The circles represent marker groups, and numbers in each circle are the marker group numbers detected. The solid lined circles indicate when a particular marker group comes within the FOV of the camera. The dash lined circles indicate when a particular marker group goes out of the FOV of the camera. As shown, there is a few meters of altitude overlap between the entering and existing marker group, providing for a smooth handover and availability of the estimates.

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the navigation system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a method comprising: providing a vehicle landing pad with a reference frame origin at a center thereof, and an X-axis and a Y-axis through the reference frame origin; arranging a first group of markers, each having a first size, on the landing pad such that the first group of markers form a first convex hull about the center of the landing pad; and arranging a second group of markers, each having a second size less than the first size, on the landing pad such that the second group of markers form a second convex hull about the center of the landing pad that is within the first convex hull; wherein the first and second groups of markers are located in a symmetrical placement with respect to the center of the landing pad along the X and Y axes so as to yield a position estimation solution for landing a vehicle that has a highest accuracy when compared with placing the markers at other locations along the X and Y axes.

Example 2 includes the method of Example 1, wherein the symmetrical placement of the markers along the X and Y axes ensures that corners of the markers are separated in a frame of a camera on the vehicle, which increases a size of the first or second convex hulls that impact positively on the position estimation solution.

Example 3 includes the method of Example 2, wherein for visible corners of the markers in a scene, the position estimation solution is most accurate when the visible corners are farthest from a center of the frame, which improves accuracy of the position estimation solution.

Example 4 includes the method of any of Examples 1-3, further comprising: placing one or more additional groups of markers, each having a size less than the second size, on the landing pad such that the one or more additional groups of markers form one or more additional convex hulls about the center of the landing pad that are within the second convex hull, the one or more additional groups of markers placed symmetrically with respect to the center of the landing pad along the X and Y axes.

Example 5 includes the method of any of Examples 1-4, further comprising: determining a marker size for the first group of markers using altitude requirements, such that the first group of markers is visible in a frame of a camera on a vehicle, which is at a farthest altitude and lateral offset with respect to the landing pad; determining a displacement distance for the first group of markers from the center of the landing pad; and determining a minimum distance of an overlap between the first group of markers and the second group of markers, such that a proper handover will occur between the first group of markers and the second group of markers, without any blind spots, during a landing phase for the vehicle.

Example 6 includes the method of Example 5, wherein the overlap between the first and second groups of markers increases available corners of the markers in the frame, which further increases availability of the position estimation solution of the vehicle.

Example 7 includes the method of any of Examples 5-6, wherein: overlapping of the markers ensures that a next biggest group of markers coming into view of the camera satisfy a minimum edge length requirement for improved position estimation accuracy; and an increase in overlapping of the markers provides for choosing corners that are spread further in the frame, thus increasing an accuracy of the position estimation solution.

Example 8 includes the method of any of Examples 1-7, wherein: the first group of markers includes four individual markers that are distinct from each other; and the second group of markers includes four individual markers that are distinct from each other and from the markers in the first group of markers.

Example 9 includes the method of Example 8, wherein each marker in the first and second groups of markers have a different identification (ID) number.

Example 10 includes the method of any of Examples 8-9, wherein each of the markers in the first and second groups of markers are equally separated along both the X and Y axes.

Example 11 includes the method of any of Examples 1-10, wherein the first and second groups of markers include reference markers, fiducials, structured patterns, or Aruco codes.

Example 12 includes the method of any of Examples 1-11, wherein the vehicle comprises a vertical takeoff and landing (VTOL) vehicle, an urban air mobility (UAM) vehicle, an uncrewed aircraft systems (UAS) vehicle, a helicopter, or a drone.

Example 13 includes a landing pad for a vehicle, comprising: a pad surface having a reference frame origin at a center thereof, and an X-axis and a Y-axis through the reference frame origin; a first group of markers on the pad surface, wherein each marker in the first group of markers has a first size such that the first group of markers form a first convex hull about the center of the pad surface; and a second group of markers on the pad surface, wherein each marker in the second group of markers has a second size less than the first size, such that the second group of markers form a second convex hull about the center of the landing pad that is within the first convex hull; wherein the first and second groups of markers are symmetrically placed with respect to the center of the pad surface along the X and Y axes.

Example 14 includes the landing pad of Example 13, further comprising: one or more additional groups of markers on the pad surface, wherein each marker in the one or more additional groups of markers has a size less than the second size, such that the one or more additional groups of markers form one or more additional convex hulls about the center of the landing pad that are within the second convex hull, wherein the one or more additional groups of markers are symmetrically placed with respect to the center of the pad surface along the X and Y axes.

Example 15 includes the landing pad of any of Examples 13-14, wherein: the first group of markers includes four individual markers that are distinct from each other; and the second group of markers includes four individual markers that are distinct from each other and from the markers in the first group of markers.

Example 16 includes the landing pad of Example 15, wherein each marker in the first and second groups of markers have a different identification (ID) number.

Example 17 includes the landing pad of any of Examples 15-16, wherein each of the markers in the first and second groups of markers are equally separated along both the X and Y axes.

Example 18 includes the landing pad of any of Examples 13-17, wherein the first and second groups of markers include reference markers, fiducials, structured patterns, or Aruco codes.

Example 19 includes the landing pad of any of Examples 13-18, wherein the pad surface is configured for landing of a vehicle that comprises a vertical takeoff and landing (VTOL) vehicle, an urban air mobility (UAM) vehicle, an uncrewed aircraft systems (UAS) vehicle, a helicopter, or a drone.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method comprising:

providing a vehicle landing pad with a reference frame origin at a center thereof, and an X-axis and a Y-axis through the reference frame origin;

arranging a first group of markers, each having a first size, on the landing pad such that the first group of markers form a first convex hull about the center of the landing pad;

arranging a second group of markers, each having a second size less than the first size, on the landing pad such that the second group of markers form a second convex hull about the center of the landing pad that is within the first convex hull;

locating the first and second groups of markers in a symmetrical placement with respect to the center of the landing pad along the X and Y axes so as to yield a position estimation solution for landing a vehicle that has a highest accuracy when compared with placing the markers at other locations along the X and Y axes;

determining a marker size for the first group of markers using altitude requirements, such that the first group of markers is visible in a frame of a camera on the vehicle, which is at a farthest altitude and lateral offset with respect to the landing pad;

determining a displacement distance for the first group of markers from the center of the landing pad; and determining a minimum distance of an overlap between the first group of markers and the second group of markers, such that a proper handover will occur between the first group of markers and the second group of markers, without any blind spots, during a landing phase for the vehicle.

2. The method of claim 1, wherein the symmetrical placement of the markers along the X and Y axes ensures that corners of the markers are separated in the frame of the camera on the vehicle, which increases a size of the first or second convex hulls that impact positively on the position estimation solution.

3. The method of claim 2, wherein for visible corners of the markers in a scene, the position estimation solution is most accurate when the visible corners are farthest from a center of the frame, which improves accuracy of the position estimation solution.

4. The method of claim 1, further comprising:

placing one or more additional groups of markers, each having a size less than the second size, on the landing pad such that the one or more additional groups of markers form one or more additional convex hulls about the center of the landing pad that are within the second convex hull, the one or more additional groups of markers placed symmetrically with respect to the center of the landing pad along the X and Y axes.

5. The method of claim 1, wherein the overlap between the first and second groups of markers increases available corners of the markers in the frame, which further increases availability of the position estimation solution of the vehicle.

6. The method of claim 1, wherein:

overlapping of the markers ensures that a next biggest group of markers coming into view of the camera satisfy a minimum edge length requirement for improved position estimation accuracy; and an increase in overlapping of the markers provides for choosing corners that are spread further in the frame, thus increasing an accuracy of the position estimation solution.

7. The method of claim 1, wherein:

the first group of markers includes four individual markers that are distinct from each other; and the second group of markers includes four individual markers that are distinct from each other and from the markers in the first group of markers.

8. The method of claim 7, wherein each marker in the first and second groups of markers have a different identification (ID) number.

9. The method of claim 7, wherein each of the markers in the first and second groups of markers are equally separated along both the X and Y axes.

10. The method of claim 1, wherein the first and second groups of markers include reference markers, fiducials, structured patterns, or Aruco codes.

11. The method of claim 1, wherein the vehicle comprises a vertical takeoff and landing (VTOL) vehicle, an urban air mobility (UAM) vehicle, an uncrewed aircraft systems (UAS) vehicle, a helicopter, or a drone.

12. A landing pad for a vehicle, comprising:

a pad surface having a reference frame origin at a center thereof, and an X-axis and a Y-axis through the reference frame origin;

a first group of markers on the pad surface, wherein each marker in the first group of markers has a first size such that the first group of markers form a first convex hull about the center of the pad surface; and a second group of markers on the pad surface, wherein each marker in the second group of markers has a second size less than the first size, such that the second group of markers form a second convex hull about the center of the landing pad that is within the first convex hull;

wherein the first and second groups of markers are symmetrically placed with respect to the center of the pad surface along the X and Y axes;

wherein a marker size is determined for the first group of markers using altitude requirements, such that the first group of markers is visible in a frame of a camera on a vehicle, which is at a farthest altitude and lateral offset with respect to the landing pad;

wherein a displacement distance is determined for the first group of markers from the center of the pad surface; and wherein a minimum distance of an overlap between the first group of markers and the second group of markers is determined, such that a proper handover will occur between the first group of markers and the second group of markers, without any blind spots, during a landing phase for the vehicle.

13. The landing pad of claim 12, further comprising:

one or more additional groups of markers on the pad surface, wherein each marker in the one or more additional groups of markers has a size less than the second size, such that the one or more additional groups of markers form one or more additional convex hulls about the center of the landing pad that are within the second convex hull, wherein the one or more additional groups of markers are symmetrically placed with respect to the center of the pad surface along the X and Y axes.

14. The landing pad of claim 12, wherein:

the first group of markers includes four individual markers that are distinct from each other; and the second group of markers includes four individual markers that are distinct from each other and from the markers in the first group of markers.

15. The landing pad of claim 14, wherein each marker in the first and second groups of markers have a different identification (ID) number.

16. The landing pad of claim 14, wherein each of the markers in the first and second groups of markers are equally separated along both the X and Y axes.

17. The landing pad of claim 12, wherein the first and second groups of markers include reference markers, fiducials, structured patterns, or Aruco codes.

18. The landing pad of claim 12, wherein the pad surface is configured for landing of a vehicle that comprises a vertical takeoff and landing (VTOL) vehicle, an urban air mobility (UAM) vehicle, an uncrewed aircraft systems (UAS) vehicle, a helicopter, or a drone.

19. The landing pad of claim 12, wherein the symmetrical placement of the markers along the X and Y axes ensures that corners of the markers are separated in the frame of the camera on the vehicle, which increases a size of the first or second convex hulls that impact positively on the position 5 estimation solution.

\* \* \* \* \*